4 Sheets—Sheet 1.

C. F. BRUSH.

Electric-Lamp.

No. 8,718. Reissued May 20, 1879.

WITNESSES

E. L. Nottingham

A. M. Bright.

INVENTOR

Chas. F. Brush.

By Dewey & Dewey

ATTORNEYS.

C. F. BRUSH.

Electric-Lamp.

No. 8,718. Reissued May 20, 1879.

WITNESSES

E. S. Nottingham

A. M. Bright

INVENTOR

Chas. F. Brush.

By Dieggett & Dieggett.

ATTORNEYS.

4 Sheets—Sheet 3.
C. F. BRUSH.
Electric-Lamp.
No. 8,718. Reissued May 20, 1879.
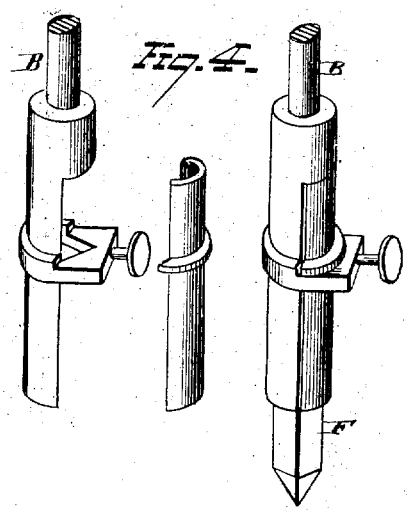
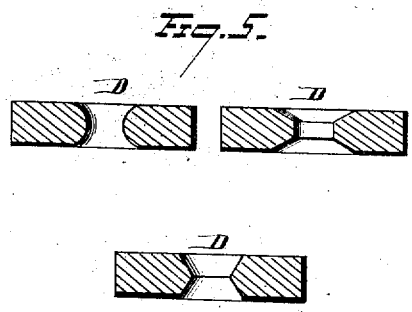
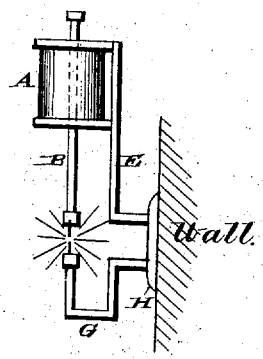
Fig. 5.
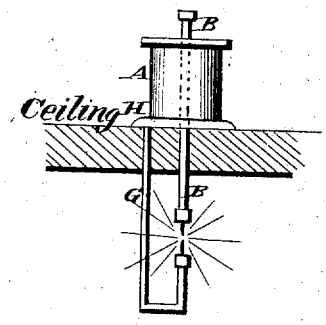
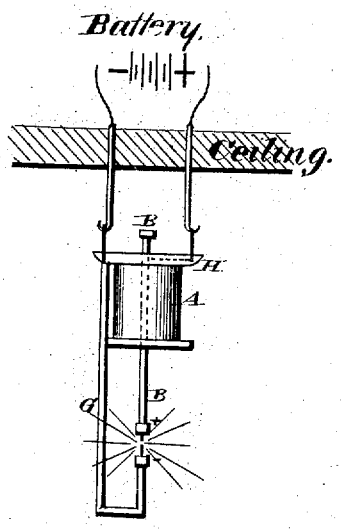
WITNESSES
E. L. Nottingham
A. M. Bright.
INVENTOR
Chas. F. Brush.
By Dieggett & Dieggett
ATTORNEYS.

C. F. BRUSH.
Electric-Lamp.
No. 8,718. Reissued May 20, 1879.
Fig. 5.
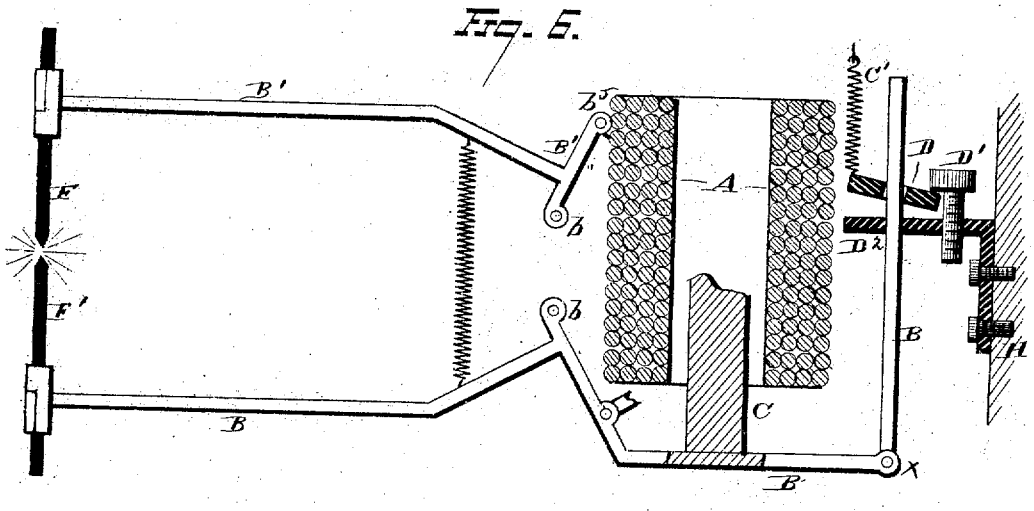
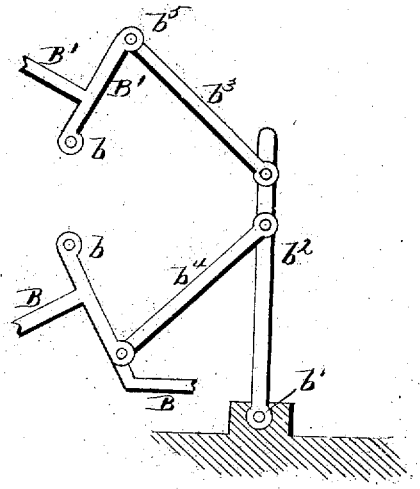
WITNESSES
E. J. Nottingham
A. M. Bright
INVENTOR
Chas F. Brush.
By Dewey & Dewey.
ATTORNEYS.

UNITED STATES PATENT OFFICE.

CHARLES F. BRUSH, OF CLEVELAND, OHIO

IMPROVEMENT IN ELECTRIC LAMPS.

Specification forming part of Letters Patent No. 203,411, dated May 7, 1878; Reissue No. 8,718, dated May 20, 1879; application filed April 14, 1879.

*To all whom it may concern:*

Be it known that I, CHARLES F. BRUSH, of Cleveland, in the county of Cuyahoga and State of Ohio, have invented certain new and useful Improvements in Electric Lamps; and I do hereby declare the following to be a full, clear, and exact description of the invention, such as will enable others skilled in the art to which it pertains to make and use it, reference being had to the accompanying drawings, which form part of this specification.

My invention relates to electric-light mechanism; and it consists in the following specified device, or its equivalent, whereby the carbon sticks usually employed are automatically adjusted, and kept in such position and relation to each other that a continuous and effective light shall be had without the necessity of any manual interference.

My invention likewise consists in an arrangement and construction, as will hereinafter appear, whereby the simple act of suspending a lamp in position will place it in circuit ready for operation.

Figure 1:
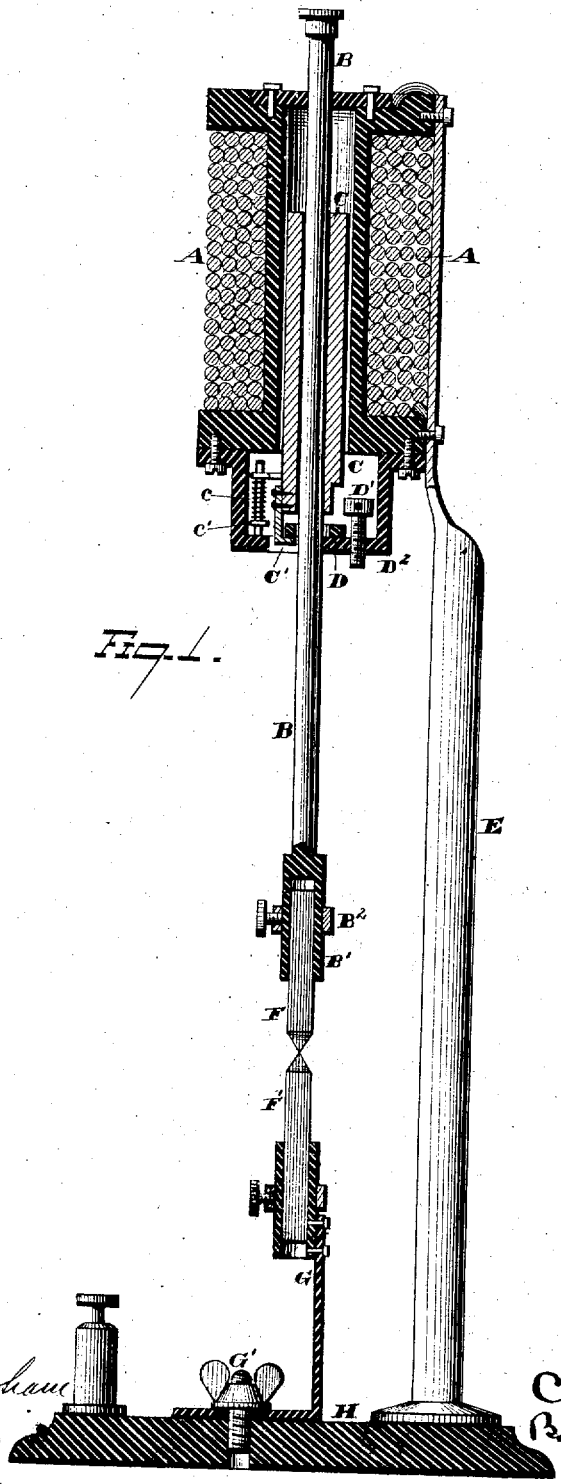
Figure 2:
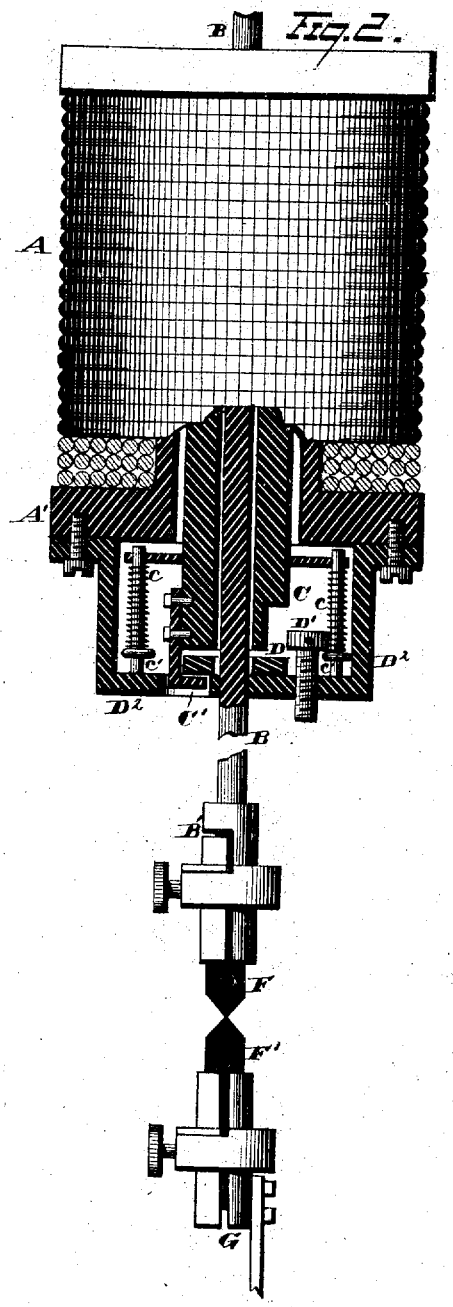
Figure 3:
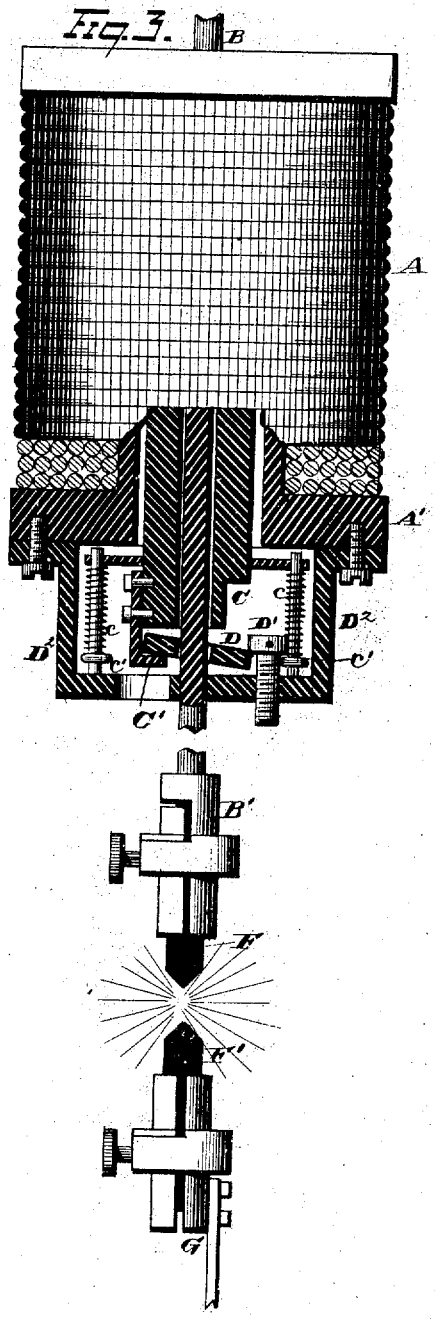

In the drawings, Figure 1 is a view, in longitudinal section, of a device embodying my invention. Fig. 2 is a detached view, showing my ring-clamp and lifter as it appears while not in operation; Fig. 3, the same as it appears while in operation. Fig. 4 is a detached view, showing my improved carbon-holder. Fig. 5 comprehends a few of various modifications of which my invention is susceptible without a departure from the spirit and principles thereof; and Fig. 6 represents a form in which my invention may be applied to a lamp that moves both of its carbons.

I will now describe the device shown in Fig. 1. A is a helix of insulated wire, said helix being in the form of a tube or hollow cylinder, resting upon an insulated plate, A′, upheld by the metallic post or standard E. Within the cavity of the helix A is contained the iron core C and the rod B, which passes loosely through the core C. The core C is also made to move very freely within the cavity of the helix A, and it is partially supported within the cavity of the said helix by means of the springs *c*, whose tension is regulated by the set-screws *c′*. These springs push upward against ears attached to the core C.

D is a ring of metal, preferably such as will not be attracted by the magnet surrounding the rod B just below the core C. One edge of the ring D is over a lifting-tongue, C′, or its equivalent, which is attached to the core C, while the opposite edge of said ring is a short distance below the crown of an adjustable set-screw, D¹. This arrangement is susceptible of various modifications, and suitable means of any description may be employed whereby one point of the ring D may be lifted in such way as to clamp the rod B, while a limit is placed to its upward movement, or to the upward movement of the core C.

The standard or support E, which may also act as a conductor, is fastened to a suitable base, H, to which base is also attached the mechanism for holding the carbon F′. This mechanism consists of a support, G, terminating in a port similar in construction to the port B¹. The lower part of this support is bent at a right angle and rests upon the base H, and is fastened to said base by the thumb or set screw G′, or any equivalent device.

It is necessary that the carbons F F′ should present in accurate apposition to each other, and to accomplish this the set-screw G′ is made to pass through a hole in the support G considerably larger than the shaft of said set-screw.

It will thus readily appear that when the set-screw G′ is loosened the support G may be moved about until its carbon F′ shall properly present toward the carbon F, when it may be secured in proper position by tightening the set-screw G′. Now, one pole of a battery or other suitable source of electricity being attached to the support G, while the other pole is connected to the support E, the electric current passes from the latter, through the helix A, rod B, and carbons F F′, down to the support G, thus completing the circuit.

The core C, by the force of the axial magnetism thus created, is drawn up within the cavity of the helix, and, by means of the finger C′, it lifts one edge of the ring D until, by its angular impingement against the rod B, it clamps said rod, and also lifts it up to a distance limited by the adjustable stop D¹.

While the ring D retains this angular relation with and impingement against the rod B said rod will be firmly retained and prevented from moving through said ring. The adjustable stop $D^1$ is fixed so that it shall arrest the lifting of the rod B when the carbons F F′ are sufficiently separated from each other. While the electric current is not passing the rod B can slide readily through the loose ring D and the core C, and it will be readily seen that in this condition the simple force of gravity will cause the carbon F to rest down upon the carbon F′, thus bringing the various parts of the device into the position of closed circuit. Now, if a current of electricity is passed through the apparatus, it will instantly operate, as just explained, to lift the rod B, and thus separate the carbons F F′ and produce the electric light.

The tension of the springs *c* is so adjusted by means of the screws *c′* or equivalent that they, together with the magnetic attraction of the helix, shall be just sufficient to support the core C, rod B, and carbon F in the position described for producing light.

As the carbons burn away, thus increasing the length of the voltaic arc, the electric current diminishes in strength, owing to the increased resistance. This weakens the magnetism of the helix, and accordingly the core, rod, and carbon F move downward by the force of gravity until the consequent shortening of the voltaic arc increases the strength of the current and stops this downward movement. After a time, however, the clutch-ring D will reach its floor or support $D^2$, and its downward movement will be arrested. Now, any further downward movement of the core C, however slight, will at once release the rod B, allowing it to slide through the ring D until it is arrested by the upward movement of the core C, due to the increased magnetism.

In continued operation, the normal position of the ring D is in contact with its lower support, the office of the core C being to regulate the sliding of the rod B through it. If, however, the rod accidentally slides too far, it will instantly and automatically be raised again, as at first, and the carbon points thus continued in proper relation to each other.

The rod B may be of such length that the longest carbon sticks may be employed, and with the device just described I experience no difficulty whatever in consuming a carbon stick of any length and obtaining a continuous and very effective light without the least manual interference.

The carbon holder here shown, which I consider to be novel with myself, consists, essentially, of a split cylinder having a square or angular cavity. One of the pieces is attached to the rod B or standard G, while the other part is loose, and is constructed to rest upon a stirrup, $B^2$. A screw passing through the stirrup $B^2$ serves to clamp and bind the carbon between the two parts just specified.

I do not limit myself narrowly to the ring D, as other devices may be employed which would accomplish the same result. Any device may be used which, while a current of electricity is not passing through the helix A, will permit the rod B to move freely up and down, but which, when a current of electricity is passed through the helix, will, by the raising of the core C, operate both to clamp and to raise the rod B, and thereby separate the carbon points F F′ and retain them in proper relation to each other.

Various devices may be used whereby the base H may be shifted or dispensed with. For instance, it may be attached in such manner as that it may be fastened to a wall or post; or it may be placed above the light in such manner as that the mechanism shall be suspended from it; or, as shown in Fig. 5 of the drawings, the base H may be placed above the light and suspended from two hooks, so as to be readily removable, if desired, and these two suspending hooks may be the positive and negative poles of the apparatus, and the hooks or eyelets to which they are swung or attached may be the positive and negative poles of the electric apparatus. Thus the mere suspension of the lamp will put it within the electric circuit, ready for operation. These variations are desirable when the device is to be used for illuminating purposes in such positions that the base H would cast an objectionable shadow.

When the light is designed to be used in light-houses, or for projecting images, &c., through lenses, it is necessary that the point of illumination be kept in one position. In such cases any appropriate means may be employed, such as, for instance, a device for raising and lowering the entire lamp.

If the ring D is employed, its opening may be provided either with sharp or angular edges, or the cavity may be beveled or rounded, as shown in Fig. 5 of the drawings. It is entirely immaterial how this ring is constructed, so long as it will act to clamp and lift and release the rod B, as heretofore specified.

I have thus far referred to my invention as applicable to a lamp wherein but one of the carbons is moved; but as it is equally applicable to lamps that move both carbons, I will now proceed to demonstrate the same by reference to the modified device shown in Fig. 6 of the drawings.

Here A is again the helix; C, the core of iron; D, the clamping-ring, grasping a rod directly connected to and controlling the movements of the rod B, holding the carbon F. C′ is a spring lifting up one edge of the ring D, similarly to the finger C in Fig. 1, and the adjustable stop $D^1$ is identical with the one heretofore specified. In this modification the motion of the core C is transmitted to the rod B, substantially as heretofore described, and the exact motion of the rod $B^1$ through suitable link-and-lever connections, $b^1$ $b^2$ $b^3$ $b^4$, is communicated in reverse to the rod $B^1$, carrying the carbon F′.

The operation of this device is substantially similar to that of the device shown at Fig. 1. A current of electricity being passed through the helix A, the core C is, by force of the axial magnetism thus created, drawn up within the cavity of said helix. The spring S, or its equivalent, acts as gravity does in the rod B (shown in Fig. 1) to keep the carbons together, and the force of the magnetism through the core C resists this tendency of the spring S to draw the carbons into actual contact. The rod B, in this instance, also passes through the ring D, which is held in its angular clamping position by the spring C′, which is the equivalent of the finger C′ of Fig. 1.

The adjustable stop $D^1$ is in all respects identical with the same element hereinbefore specified. The ring D, in this instance, acts in a similar manner as heretofore described in governing and controlling the rod B.

The main point of difference between the devices shown in Figs. 1 and 6 is this: In the former one carbon is stationary and the other moves; in the latter one carbon-holder is moved substantially in the same manner as in the former, but it is made to impart a similar reverse motion to the holder of the other carbon by suitable link-and-lever connections.

I have practically and thoroughly tested the two forms of my invention as shown in the devices just specified, and in point of their capacity to consume long carbon sticks and produce a continuous and effective light without the necessity of manual interference I find them perfectly operative.

It may be proper to specify more clearly the link-and-lever connection between the rods B and $B^1$. Each rod is pivoted to a common frame at *b*. The rod B extends from the carbon F′ to a point beyond the ring D, having a joint, *x*, where it is made to turn beyond the helix A. It is journaled at or near the end of a swinging lever, $b^2$, said lever hinged to the common frame at $b^1$. The rod $B^1$ extends from the carbon F to the point $b^5$, where it journals with a link, $b^3$, which connects it to the lever $b^2$ at or very near the point of connection of the rod B.

It will now readily be seen that a motion given to either rod B or $B^1$ will be imparted in reverse to the other.

Among the numerous advantages secured by my invention, as above specified, may be enumerated the following:

First, by the use of copper-coated carbons it is entirely feasible to employ a lamp that moves only its positive carbon. The waste of the negative carbon is so very slow that the point of illumination is kept practically at one point for a considerable length of time—say, one or two hours or more.

Second, carbon sticks of any length may be entirely consumed, and an effective light produced without manual interference.

Third, whenever the light is put out the carbon points will certainly be brought into actual contact, and in this condition the lamp will automatically produce the electric light upon the establishment of the electric current. This feature of always being in condition to automatically set and continue itself in effective operation I consider to be an effect never before practically attained, although many efforts have been made in that direction that have been partially successful.

What I claim is—

1. In an electric lamp, the combination, with the carbon-holder and core, of a clamp surrounding the carbon-holder, said clamp being independent of the core, but adapted to be raised by a lifter secured thereto, substantially as set forth.

2. In an electric lamp, the combination of the clamp D and adjustable stop $D^1$, or their equivalents, by means of which the carbon points are prevented from becoming so far separated as to break the electric current and extinguish the light, substantially as specified.

3. In an electric lamp, the combination of the core or armature C, the clamp D, and adjustable stop $D^1$, or their equivalents, whereby the points of the carbons are separated from each other when an electrical current is established, prevented from separating so far as to break the current, and gradually fed together as the carbons are consumed, substantially as described.

4. In combination with the core C, one or more adjustable sustaining-springs, *c*, substantially as and for the purpose shown.

5. In an electric lamp, the combination, with a carbon-holder, of an annular clamp surrounding the carbon-holder, said clamp adapted to be moved, and thereby to separate the carbon points by electrical or magnetic action, substantially as herein set forth.

6. In an electric lamp, an annular clamp adapted to grasp and move a carbon-holder, substantially as shown.

7. An electric lamp provided with suspending or attaching hooks, loops, or their equivalent, representing and placed in electrical connection, respectively, with the positive and negative poles of the lamp, substantially as shown.

8. An electric lamp provided with suspending or attaching hooks, loops, or their equivalent, representing and placed in electrical connection, respectively, with the positive and negative poles of the lamp, in combination with stationary hooks, loops, or their equivalent, placed in electrical connection, respectively, with the positive and negative poles of the battery, dynamo-electric machine, or other source of electric current, said stationary hooks or loops being located at the place where the lamp is intended to be used, substantially as specified.

In testimony whereof I have signed my name to this specification in the presence of two subscribing witnesses.

CHARLES F. BRUSH.

Witnesses:

LEVERETT L EGGETT,
WILLIAM E. NNELLY.